United States Patent
Bakker

(10) Patent No.: US 7,180,439 B1
(45) Date of Patent: Feb. 20, 2007

(54) MULTI-PATH DIGITAL POWER SUPPLY CONTROLLER

(75) Inventor: Anthonius Bakker, Morgan Hill, CA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/378,543

(22) Filed: Mar. 16, 2006

(51) Int. Cl.
*H03M 1/12* (2006.01)

(52) U.S. Cl. .................. 341/155; 341/144; 341/141

(58) Field of Classification Search ............. 341/155, 341/144, 141, 166; 375/297; 332/107; 455/126; 361/18; 290/52; 330/10
See application file for complete search history.

(56) References Cited

U.S. PATENT DOCUMENTS

| | | | | |
|---|---|---|---|---|
| 4,939,786 | A * | 7/1990 | McCallum et al. | 455/67.11 |
| 6,414,560 | B2 * | 7/2002 | Delano | 332/107 |
| 6,768,779 | B1 * | 7/2004 | Nielsen | 375/297 |
| 6,809,678 | B2 * | 10/2004 | Vera et al. | 341/166 |
| 6,946,984 | B2 * | 9/2005 | Rubin et al. | 341/141 |
| 6,972,969 | B1 * | 12/2005 | Shteynberg et al. | 363/21.12 |
| 7,002,406 | B2 * | 2/2006 | Risbo et al. | 330/10 |
| 7,072,626 | B2 * | 7/2006 | Hadjichristos | 455/126 |
| 2002/0167354 | A1 * | 11/2002 | Stanley | 330/10 |
| 2004/0245783 | A1 * | 12/2004 | Gilbreth et al. | 290/52 |
| 2005/0135023 | A1 * | 6/2005 | Goder et al. | 361/18 |
| 2006/0208716 | A1 | 9/2006 | Chapuis | |
| 2006/0227028 | A1 * | 10/2006 | Balogh et al. | 341/144 |

OTHER PUBLICATIONS

Potter, Geof, "An Introduction to Digital Control of Switching Power Converters", Apr. 2004, pp. 1-9.
"Digital Power Controller", Si8250/1/2; Silicon Laboratories, Mar. 2006, pp. 1-30.

* cited by examiner

*Primary Examiner*—Jean Bruner Jeanglaude
(74) *Attorney, Agent, or Firm*—Koppel, Patrick, Heybl & Dawson

(57) ABSTRACT

A multi-path digital power supply controller includes a first ADC (ADC1) coupled to the supply's output voltage $V_{out}$ and arranged to provide an output which varies with $V_{out}$'s low frequency components, and a second ADC (ADC2) coupled to $V_{out}$ and arranged to provide an output which varies with $V_{out}$'s high frequency components. A digital reference value is subtracted from the output of ADC1 to produce a low frequency digital error signal, and a summing circuit sums the low frequency digital error signal and the output of ADC2. Processing circuitry is arranged to produce an output which varies with the summed signal and is suitable for coupling to a power stage for use in regulating $V_{out}$. Preferably, ADC1 is a low-bandwidth high-resolution ADC and ADC2 is a high-bandwidth low-resolution ADC, both of which are low-cost components.

23 Claims, 3 Drawing Sheets

US 7,180,439 B1

MULTI-PATH DIGITAL POWER SUPPLY CONTROLLER

BACKGROUND OF THE INVENTION

1. Field of the Invention

This invention relates to power supply controllers, and particularly to digital power supply controllers.

2. Description of the Related Art

Power supplies typically comprise a power stage and a controller, with the controller arranged to operate the power stage as needed to produce a desired output voltage. A power stage can be, for example, a pass transistor (for a linear power supply) or a switching circuit which drives an output inductor and capacitor (for a switching power supply).

A typical switching power supply which includes an analog controller is shown in FIG. 1a. In this example, power stage 10 includes a switching circuit 12 which drives an output inductor L1 and capacitor C1, to produce an output voltage $V_{out}$. The controller includes an analog error amplifier 14 which receives $V_{out}$ at one input and an analog reference voltage $V_{ref}$ at a second input; the value of $V_{ref}$ is typically programmed by a potentiometer 16. Note that, typically, only a fraction of $V_{out}$ is provided to amplifier 14, via a voltage divider (not shown for simplicity). The resulting error voltage $V_{err}$ is filtered (18) and used to drive a pulse-width modulation (PWM) circuit 20, the output of which controls the operation of power stage 10. Power supplies of this type are widely used; however, they are limited in that, because the controller is analog, reference voltage $V_{ref}$ and the characteristics of filter 18 cannot be easily changed using computer software.

One possible digital controller is shown in FIG. 1b. Here, the analog error amplifier is replaced with an analog-to-digital converter (ADC) 30. The reference voltage is subtracted from the output of the ADC to produce an error voltage, but here, the reference voltage $V_{ref}$ is represented digitally, and the subtraction of the reference voltage and the filtering (32) are both done in the digital domain. However, though both the reference voltage and filter characteristics can be changed using software, the ADC typically requires both high-bandwidth and high-resolution characteristics, making it an expensive building block for this solution.

Another approach is shown in FIG. 1c. Here, an analog error amplifier 40 is imposed between $V_{out}$ and an ADC 42; by so doing, the resolution of the ADC can be much lower than that required in FIG. 1b. However, to retain the option of programming reference voltage $V_{ref}$, a high-resolution digital-to-analog converter (DAC) is required.

SUMMARY OF THE INVENTION

A digital power supply controller is presented which overcomes the problems noted above, providing digital control of reference voltage and filtering without the need for a high-bandwidth/high-resolution ADC or a high-resolution DAC.

The present digital power supply controller is referred to as a 'multi-path' controller, in that the high frequency and low frequency components of $V_{out}$ are processed with separate ADCs. A first ADC (ADC1) is coupled to $V_{out}$ and is arranged to provide a digital output which varies with the low frequency components of $V_{out}$, and a second ADC (ADC2) is coupled to $V_{out}$ and arranged to provide a digital output which varies with $V_{out}$'s high frequency components. A digital reference value is subtracted from the digital output of ADC1 to produce a low frequency digital error signal, and a summing circuit sums the low frequency digital error signal and the digital output of ADC2. Processing circuitry is arranged to produce an output which varies with the summed signal and is suitable for coupling to a power stage for use in regulating $V_{out}$.

When so arranged, ADC1 can be a low-bandwidth high-resolution ADC and ADC2 can be a high-bandwidth low-resolution ADC, both of which are low-cost components. A high pass filter (HPF) would typically be connected between $V_{out}$ and the input of ADC2 to ensure that only the high frequency components of $V_{out}$ are presented to the high-bandwidth low-resolution ADC2.

The processing circuitry, which typically includes a digital filter, forms part of the power supply's control loop, and can be adapted for use with a number of power supply types, including those employing resonant and linear topologies.

Further features and advantages of the invention will be apparent to those skilled in the art from the following detailed description, taken together with the accompanying drawings.

DETAILED DESCRIPTION OF THE INVENTION

Figure 1A:
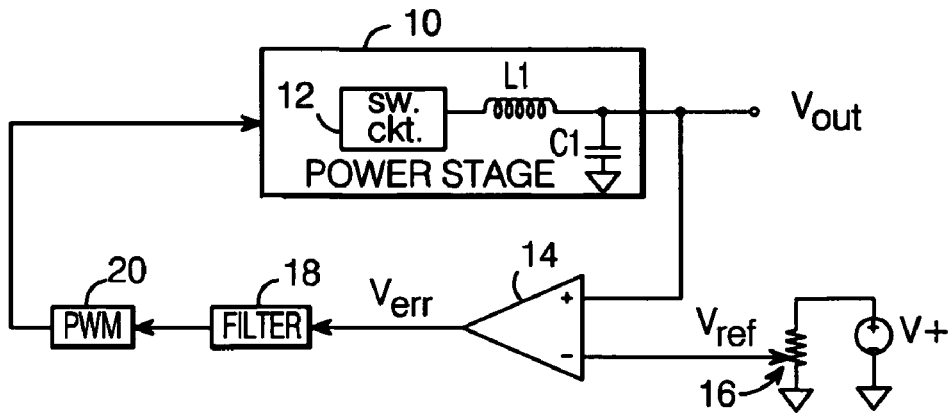
FIGS. 1a–1c are block diagrams of known power supply controllers.
Figure 1B:
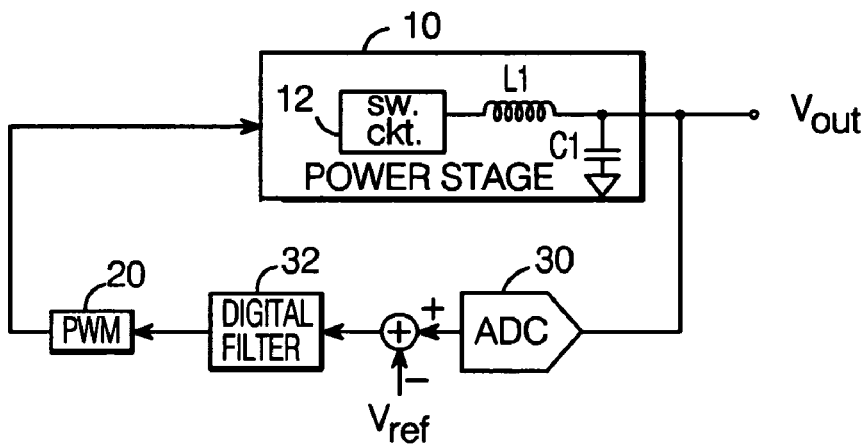
Figure 1C:
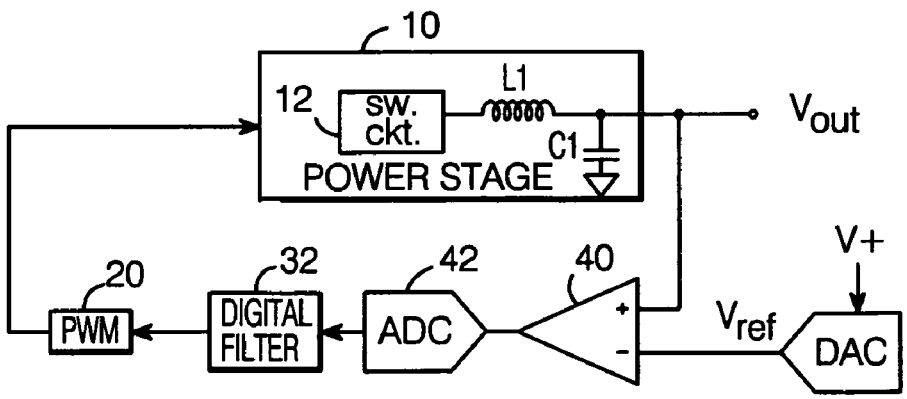
Figure 2:
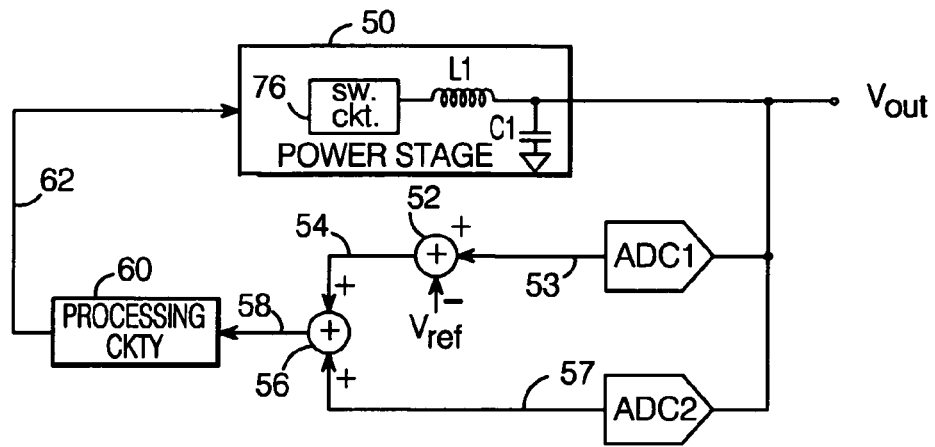
FIG. 2 is a block diagram illustrating the principles of a multi-path power supply controller in accordance with the present invention.

The basic principles of a power supply controller in accordance with the present invention are illustrated in FIG. 2. The controller is combined with a power stage 50 to form a power supply which produces an output voltage $V_{out}$. Though $V_{out}$ is primarily a DC voltage, it typically contains both high-frequency and low-frequency components, especially when high speed switching is employed to generate the regulated voltage, as in a switching power supply.

Conventionally, providing a digital controller capable of accommodating the high-frequency and low-frequency components of $V_{out}$ requires the use of an ADC which meets the requirements imposed by both frequency components. A high-resolution/high-bandwidth ADC of this sort may be unacceptably costly. The invention overcomes this problem by employing two ADCs: a first ADC (ADC1) having characteristics suitable for converting the low-frequency components of $V_{out}$, and a second ADC (ADC2) suitable for converting $V_{out}$'s high-frequency components. This is preferably accomplished by arranging the ADCs such that, relative to each other, ADC1 is a low-bandwidth high-resolution ADC and ADC2 is a high-bandwidth low-resolution ADC. By so doing, both ADCs can be relatively low-priced devices in comparison with the high-bandwidth high-resolution ADC that might otherwise be required. Note that, as noted above, typically only a fraction of $V_{out}$ is fed back to the ADCsamplifier4, via a voltage divider (not shown for simplicity).

The present controller also includes a means 52, typically a digital subtraction circuit, for subtracting a digital reference value ($V_{ref}$) from the digital output 53 of ADC1 to produce a low frequency digital error signal 54. Digital reference value $V_{ref}$ would typically represent a desired value for power supply output voltage $V_{out}$. A summing circuit 56 sums low frequency digital error signal 54 and the digital output 57 of ADC2, producing summed signal 58. Summed signal 58 is provided to processing circuitry 60, which is arranged to produce an output 62 which varies with summed signal 58 and is suitable for coupling to power stage 50 for use in regulating $V_{out}$. The present controller can be designed to implement one of several different power supply types, including switching, resonant, and linear topologies.

Figure 3:
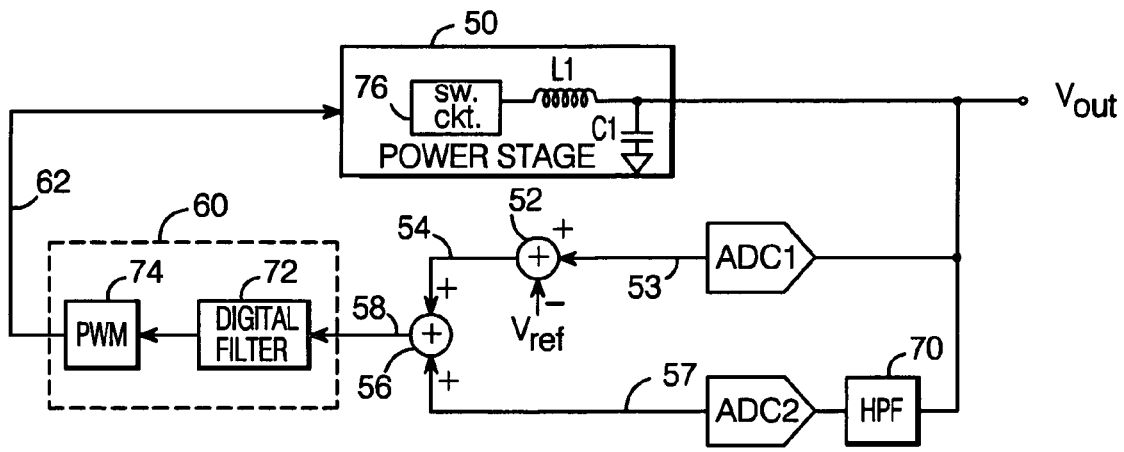
FIG. 3 is a block diagram of one possible implementation of a multi-path power supply controller in accordance with the present invention.

One possible implementation of a multi-path power supply controller in accordance with the present invention is shown in FIG. 3. Here, a high pass filter (HPF) 70 suitable for passing $V_{out}$'s high frequency components is connected between $V_{out}$ and the input of ADC2. HPF 70 serves to reduce the dynamic range of the signal presented to ADC2, enabling the resolution characteristic of ADC2 to be reduced. Removing the low-frequency components from $V_{out}$ in this way serves to make the output 57 of ADC2 effectively a high-frequency error signal analogous to low-frequency error signal 54.

ADC1 is preferably arranged to perform a low-pass filter function on $V_{out}$. To that end, ADC1 is preferably an oversampling converter such as a sigma delta (SD) converter. An SD converter consists of an SD modulator and a decimation filter, which functions as a digital low-pass filter. This arrangement provides a low-cost, low-bandwidth, high-resolution ADC.

For this configuration, the DC accuracy of the control loop is determined by ADC1, and the DC gain of ADC2 is essentially zero. Since there is no DC accuracy requirement for HPF 70 to meet, it can be implemented very inexpensively.

FIG. 3 depicts one possible embodiment of processing circuit 60: a digital filter 72 and a pulse-width modulation circuit 74. The output 58 of summing circuit 56 is fed to the input of filter 72, the output of which drives PWM circuit 74 to produce an output 62 suitable for driving power stage 50 so as to regulate $V_{out}$. Processing circuitry 60 is part of the power supply's control loop, and digital filter 72 functions to provide stability and phase margin to the loop. Digital filter 72 may be, for example, a PID or a type-3 filter.

The present controller can be employed in a number of different power supply types, including various switching and linear topologies. A typical switching power supply will have a power stage 50 such as that shown in FIGS. 2 and 3, in which a switching circuit 76 drives an output inductor and capacitor to produce output voltage $V_{out}$. Here, the operation of switching circuit 76 is controlled by the output 62 of processing circuitry 60, which would typically include a digital filter and PWM circuit as shown.

Figure 4:
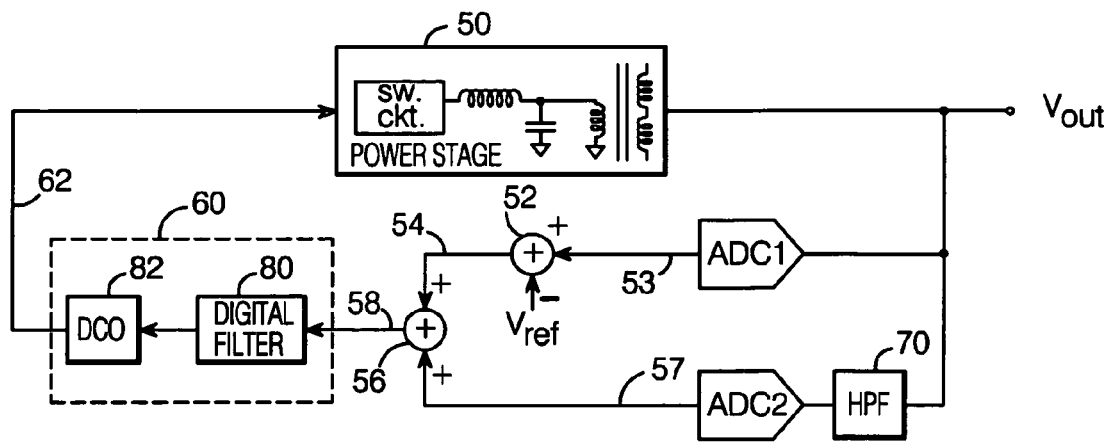
FIG. 4 is a block diagram of another possible implementation of a multi-path power supply controller in accordance with the present invention.

The present controller might also be employed in a power supply having a resonant topology; this is depicted in FIG. 4. Here, the output 58 of summing circuit 56 is used to modulate the frequency of signal 62, rather than the pulse width. As such, processing circuitry 60 would typically include a digital filter 80 and digitally-controlled oscillator (DCO) 82 as shown.

Figure 5:
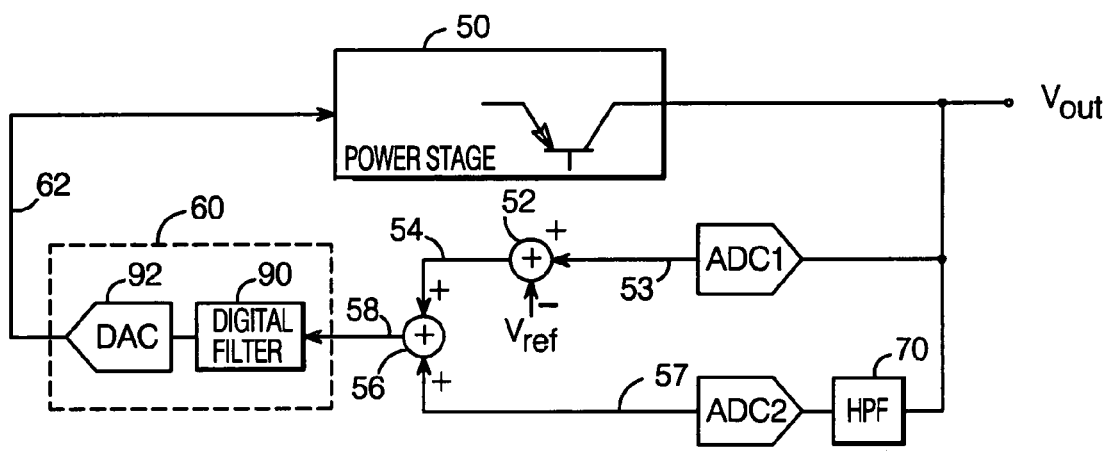
FIG. 5 is a block diagram of another possible implementation of a multi-path power supply controller in accordance with the present invention.

As noted above, the present controller might also be employed in a linear power supply; this is depicted in FIG. 5. Here, the output 62 of processing circuitry 60 is used to modulate the gate (or base) voltage of a pass transistor. As such, processing circuitry 60 would typically include a digital filter 90 and a digital-to-analog converter (DAC) 92 as shown. Note that though each of filters 72, 80 and 90 would be digital filters, it is likely that each would have different characteristics.

Also note that, though not shown, a controller per the present invention might receive multiple control signals that are combined with summed signal 58 to perform various functions. Possible control signals could be associated, for example, with soft-start and soft-stop routines and current sharing functions. During start-up, a limiting control signal might be added to reduce in-rush current or output voltage overshoot. For current sharing, an offset signal might be added to match the output currents of multiple parallel power supplies. Limiters, such as a PWM limit circuit, might also be used to avoid breakdown of external power components.

Note that the power supply configurations shown in FIGS. 2-5 are merely exemplary. It is only essential that the present power supply controller include first and second ADCs arranged to convert $V_{out}$'s low and high frequency components, respectively, a means for subtracting a digital reference value from the output of the low frequency ADC, and a summing circuit which sums the error signal with the output of the high frequency ADC.

While particular embodiments of the invention have been shown and described, numerous variations and alternate embodiments will occur to those skilled in the art. Accordingly, it is intended that the invention be limited only in terms of the appended claims.

I claim:

1. A multi-path digital power supply controller, comprising:
   a first analog-to-digital converter (ADC) adapted to be coupled to the output of a power supply which is controlled by said controller, said power supply including a power stage which produces an output voltage having low frequency components and high frequency components, said first ADC arranged to provide a digital output which varies with the low frequency components of said power supply output;
   a means for subtracting a digital reference value from said digital output to produce a low frequency digital error signal;
   a second ADC adapted to be coupled to the output of said power supply and arranged to provide a digital output which varies with the high frequency components of said power supply output;
   a summing circuit which sums said low frequency digital error signal and the digital output of said second ADC; and
   processing circuitry arranged to produce an output which varies with said summed signal and is suitable for coupling to said power stage for use in regulating said power supply output.

2. The controller of claim 1, further comprising a high pass filter (HPF) having an input and an output, said HPF suitable for passing said high frequency components from its input to its output, said HPF's input adapted to be coupled to said power supply output and its output provided to the analog input of said second ADC.

3. The controller of claim 1, wherein each of said first and second ADCs has associated bandwidth and resolution characteristics, said ADCs arranged such that, relative to each other, said first ADC is a low-bandwidth high-resolution ADC and said second ADC is a high-bandwidth low-resolution ADC.

4. The controller of claim 1, wherein said first ADC is an oversampling converter.

5. The controller of claim 4, wherein said first ADC is a sigma delta converter.

6. The controller of claim 5, wherein said sigma delta converter comprises:
   a sigma delta modulator; and
   a decimation filter.

7. The controller of claim 1, wherein said means for subtracting comprises a digital subtraction circuit.

8. The controller of claim 1, wherein said processing circuitry is part of a control loop which regulates the output voltage of said power supply, said processing circuitry including a digital filter arranged to provide stability for said control loop.

9. The controller of claim 1, wherein said digital filter has characteristics which vary with a digital control signal provided to said filter, said controller further comprising a processor programmed to provide said digital reference value and said digital control signal.

10. The controller of claim 8, wherein said filter comprises a proportional-integral-derivative (PID) filter.

11. The controller of claim 8, wherein said filter comprises a type-3 filter.

12. The controller of claim 1, wherein said power supply is a switching power supply.

13. The controller of claim 1, wherein said power supply is a linear power supply.

14. The controller of claim 1, wherein said processing circuitry comprises:
   a digital filter which receives said summed signal at an input; and
   a pulse width modulation (PWM) circuit which receives the output of said digital filter and produces said output suitable for coupling to said power stage for use in regulating said power supply output.

15. The controller of claim 1, wherein said power supply employs a resonant topology and said processing circuitry comprises:
   a digital filter which receives said summed signal at an input; and
   a digitally-controlled oscillator (DCO) which receives the output of said digital filter and produces said output suitable for coupling to said power stage for use in regulating said power supply output.

16. The controller of claim 1, wherein said power supply employs a linear topology and said processing circuitry comprises:
   a digital filter which receives said summed signal at an input; and
   a digital-to-analog converter (DAC) which receives the output of said digital filter and produces said output suitable for coupling to said power stage for use in regulating said power supply output.

17. The controller of claim 1, wherein said digital reference value represents a desired output voltage for said power supply.

18. A multi-path digital power supply controller, comprising:
   a first analog-to-digital converter (ADC) adapted to be coupled to the output of a power supply which is controlled by said controller, said power supply including a power stage which produces an output voltage having low frequency components and high frequency components, said first ADC arranged to provide a digital output which varies with the low frequency components of said power supply output;
   a digital subtraction circuit for subtracting a digital reference value from said digital output to produce a low frequency digital error signal, said digital reference value representing a desired power supply output voltage;
   a high pass filter (HPF) having an input and an output, said HPF suitable for passing said high frequency components from its input to its output, said HPF's input adapted to be coupled to said power supply output;
   a second ADC adapted to be coupled to said HPF's output and arranged to provide a digital output which varies with the high frequency components of said power supply output, said first and second ADCs having associated bandwidth and resolution characteristics and arranged such that, relative to each other, said first ADC is a low-bandwidth high-resolution ADC and said second ADC is a high-bandwidth low-resolution ADC;
   a summing circuit which sums said low frequency digital error signal and the digital output of said second ADC; and
   processing circuitry arranged to produce an output which varies with said summed signal that is suitable for coupling to said power stage for use in regulating said power supply output.

19. The controller of claim 18, wherein said processing circuitry is part of a control loop which regulates the output voltage of said power supply, said processing circuitry including a digital filter arranged to provide stability for said control loop.

20. The controller of claim 19, wherein said digital filter has characteristics which vary with a digital control signal provided to said filter, said controller further comprising a processor programmed to provide said digital reference value and said digital control signal.

21. The controller of claim 19, wherein said processing circuitry further comprises a pulse width modulation (PWM) circuit which receives the output of said digital filter and produces said output suitable for coupling to said power stage for use in regulating said power supply output.

22. A power supply, comprising:
   a power stage which produces an output voltage $V_{out}$ in response to a control signal received from a controller, $V_{out}$ having low frequency components and high frequency components; and
   a digital power supply controller, comprising:
      a first analog-to-digital converter (ADC) coupled to $V_{out}$ and arranged to provide a digital output which varies with $V_{out}$'s low frequency components;
      a digital subtraction circuit for subtracting a digital reference value from said digital output to produce a low frequency digital error signal, said digital reference value representing a desired $V_{out}$ value;
      a high pass filter (HPF) having an input and an output, said HPF suitable for passing said high frequency components from its input to its output, said HPF's input coupled to $V_{out}$;
      a second ADC coupled to said HPF's output and arranged to provide a digital output which varies with $V_{out}$'s high frequency components, said first and second ADCs having associated bandwidth and resolution characteristics and arranged such that, relative to each other, said first ADC is a low-bandwidth high-resolution ADC and said second ADC is a high-bandwidth low-resolution ADC;

a summing circuit which sums said low frequency digital error signal and the digital output of said second ADC; and processing circuitry arranged to produce an output which varies with said summed signal, said processing circuitry output being said control signal for said power stage.

23. The power supply of claim 22, further comprising a voltage divider arranged to provide a fraction of $V_{out}$ to the analog input of said first ADC and to the input of said HPF.

* * * * *